H. LIPPOLD & A. RAUTENBERG.
Adjustable Hooks for Curtain Rods.

No. 242,206. Patented May 31, 1881.

Witnesses:
A. P. Grant,
W. F. Kircher

Inventors:
Hermann Lippold,
Adolf Rautenberg,
by John A. Wiedersheim
Attorney

United States Patent Office.

HERMANN LIPPOLD AND ADOLF RAUTENBERG, OF HIRSCHBERG, PRUSSIA, GERMANY.

ADJUSTABLE HOOK FOR CURTAIN-RODS.

SPECIFICATION forming part of Letters Patent No. 242,206, dated May 31, 1881.

Application filed July 28, 1880. (No model.) Patented in Germany October 23, 1879.

*To all whom it may concern:*

Be it known that we, HERMANN LIPPOLD and ADOLF RAUTENBERG, both of Hirschberg, Province of Silesia, Kingdom of Prussia, German Empire, have invented a new and useful Improvement in Hooks for Supporting Curtain-Rods, also applicable for other similar purposes, of which the following is the specification, reference being had to the accompanying drawings, in which—

Figure 1:
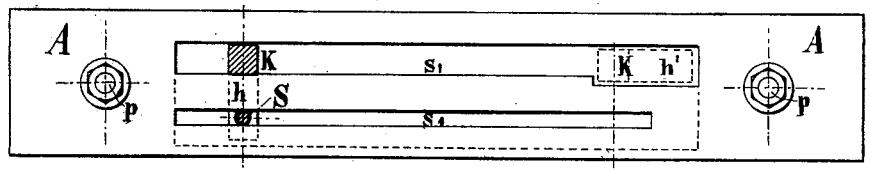
Figure 2:
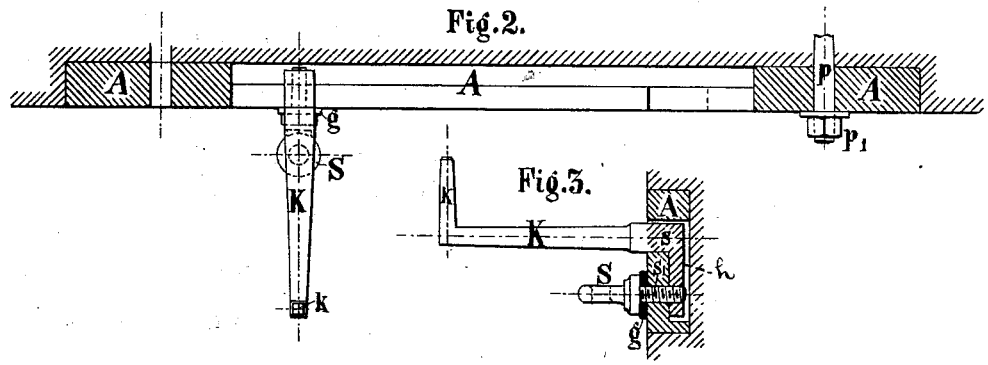
Figure 3:
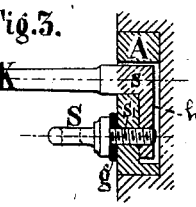
Figure 4:
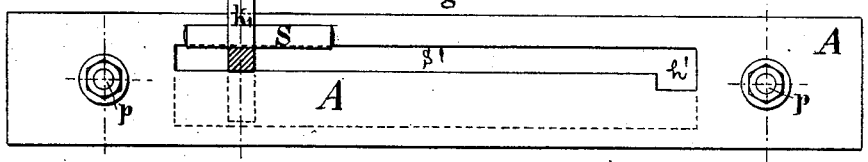
Figures 5, 6, 7:
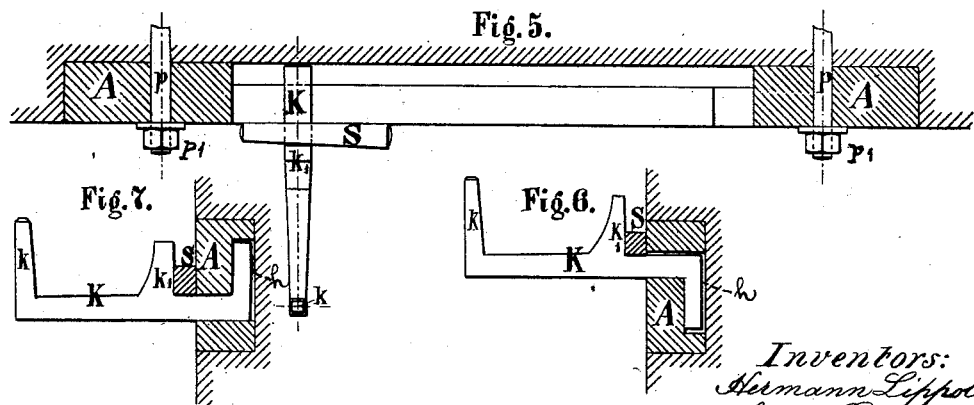

Figure 1 is a front view of the face-plate and a vertical section of the hook of the curtain-rod support embodying our invention. Fig. 2 is a horizontal section of the plate and plan view of the hook. Fig. 3 is a vertical section of the plate and side elevation of the hook. Figs. 4, 5, 6, and 7 are views of modifications.

Similar letters of reference indicate corresponding parts in the several figures.

Our invention consists of supports for curtain-rods made adjustable and removable, as will be hereinafter set forth.

Referring to the drawings, A represents the face-plate, which is adapted to be nailed or screwed to a wall, as at $p$. In the plate A are two parallel slots or ways, S' S', which extend horizontally and longitudinally.

K represents hooks, which are adapted to be sustained on the plate A and support curtains, curtain-rods, &c., the inner ends of each hook having a vertical limb, $h$, which, in order to enter the slot S', is turned horizontally, then passed through the widened end of said slot, and returned to upright position, the space back of the slots S' S' receiving said inner limb of the hook.

It will be noticed that the shank of the hook which enters the slot S' is angular in cross-section, so that after it has been introduced into the widened part $h'$ of said slot and turned and moved into the narrow part thereof the said shank fits said narrow part of the slot snugly, and the hook is thereby prevented from turning in use unless again moved to the widened part of the slot, which is only occasioned for entire removal of the hook from the face-plate.

Through the slot S' is inserted a screw, S, which enters an opening in the limb $h$ of the hook K, the flanged head of the screw being tightened against the front wall of the plate A. A washer, $g$, is interposed between the flange and the wall for preventing injury to the plate A.

It will be seen that when the hook is applied to the plate A it may be readily moved to the right and left relatively to the length of the curtain-rods, &c., and when adjusted the screw S is tightened, thus sustaining the hook in position. The hook may be readily displaced by loosening the screw, sliding the hook toward the wide end of the slot S, and turning the hook sidewise, so that the limb $h$ may emerge from said slot.

In Figs. 4, 5, 6, and 7 the lower slot of the plate A is omitted, and in lieu of the screw S a wedge, S, is provided. In this case the inner end of the shank of the hook has a nose or stud, $k'$, between which and the wall of the slot the wedge S is forced, thus securely holding the hook in position. The lateral adjustment of the hook and its removal is accomplished similar to that hereinbefore stated.

Having thus described our invention, what we claim as new, and desire to secure by Letters Patent, is—

The plate A, having two parallel slots or ways, S' S', in combination with the hook K, having a vertical limb, $h$, and the screw S, the shank of the hook entering one of said slots and the screw the other slot, substantially as and for the purpose set forth.

HERMANN LIPPOLD.
ADOLF RAUTENBERG.

Witnesses:
E. HAASE,
FRANZ POSTAWKA.